US010118397B2

(12) United States Patent
Takei

(10) Patent No.: US 10,118,397 B2
(45) Date of Patent: Nov. 6, 2018

(54) RECORDING APPARATUS

(71) Applicant: SEIKO EPSON CORPORATION, Tokyo (JP)

(72) Inventor: Atsushi Takei, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/321,354

(22) PCT Filed: Aug. 25, 2015

(86) PCT No.: PCT/JP2015/004268
§ 371 (c)(1),
(2) Date: Dec. 22, 2016

(87) PCT Pub. No.: WO2016/031233
PCT Pub. Date: Mar. 3, 2016

(65) Prior Publication Data
US 2017/0210138 A1   Jul. 27, 2017

(30) Foreign Application Priority Data

Aug. 29, 2014  (JP) ................................ 2014-175121

(51) Int. Cl.
*B41J 2/175* (2006.01)
*B41J 29/13* (2006.01)
*F16L 37/32* (2006.01)
*B41J 29/38* (2006.01)
(Continued)

(52) U.S. Cl.
CPC ........... *B41J 2/17523* (2013.01); *B41J 2/175* (2013.01); *B41J 2/1752* (2013.01); *B41J 2/17509* (2013.01); *B41J 2/17596* (2013.01); *B41J 29/02* (2013.01); *B41J 29/13* (2013.01);
(Continued)

(58) Field of Classification Search
CPC ...................................................... F16L 29/04
See application file for complete search history.

(56) References Cited

U.S. PATENT DOCUMENTS 2,761,469 A * 9/1956 Hansen ................... F16L 37/23
   137/513.5
4,067,329 A * 1/1978 Winicki ............ A61M 16/0051
   128/202.22

(Continued)

FOREIGN PATENT DOCUMENTS

| JP | 2008-238787 A | 10/2008 |
| JP | 2013-151098 A | 8/2013 |
| JP | 2013-176946 A | 9/2013 |

*Primary Examiner* — Shelby L Fidler

(57) ABSTRACT

In a recording apparatus, one end section sides of first liquid supply tubes are connected to ink tanks which are provided to be able to be attached and detached from outer sections of a main housing. Other end section sides of second liquid supply tubes, where one end section sides are connected to a liquid ejecting head side which is provided in an inner section of the main housing, are connected to other end section sides of the first liquid supply tubes using connection members. Out of first connection sections which are provided in the connection members on the first liquid supply tubes side and second connection sections which are provided in the connection members on the second liquid supply tubes side, at least the first connection sections are provided so as to be positioned at outer sections of the main housing.

11 Claims, 12 Drawing Sheets

(51) Int. Cl.
*F16L 37/30* (2006.01)
*B41J 29/02* (2006.01)

(52) U.S. Cl.
CPC .............. *B41J 29/38* (2013.01); *F16L 37/30* (2013.01); *F16L 37/32* (2013.01)

(56) References Cited

U.S. PATENT DOCUMENTS

| | | | | |
|---|---|---|---|---|
| 4,757,331 | A * | 7/1988 | Mizusawa | B41J 2/175 137/594 |
| 5,405,336 | A * | 4/1995 | Austin | A61M 25/0014 604/534 |
| 5,686,947 | A * | 11/1997 | Murray | B41J 2/17513 347/85 |
| 5,751,319 | A * | 5/1998 | Robertson | B41J 2/17509 347/85 |
| 2005/0128261 | A1 * | 6/2005 | Wouters | F16L 37/367 347/85 |
| 2006/0232645 | A1 * | 10/2006 | Kumagai | B41J 2/16523 347/85 |
| 2006/0274131 | A1 * | 12/2006 | Noguchi | B41J 2/17509 347/85 |
| 2012/0169811 | A1 * | 7/2012 | Lin | B41J 2/17506 347/85 |
| 2015/0022595 | A1 * | 1/2015 | Kim | B41J 2/17509 347/85 |
| 2015/0174906 | A1 * | 6/2015 | Sakamoto | B41J 2/17523 347/85 |
| 2015/0210083 | A1 * | 7/2015 | Momose | B41J 2/17553 347/86 |
| 2015/0306885 | A1 * | 10/2015 | Igarashi | B41J 2/16508 347/19 |
| 2016/0001567 | A1 * | 1/2016 | Okuno | B41J 2/17596 347/85 |
| 2017/0120618 | A1 * | 5/2017 | Nakamura | B41J 2/17523 |
| 2017/0129243 | A1 * | 5/2017 | Otagiri | B41J 2/16511 |
| 2017/0225483 | A1 * | 8/2017 | Sagegami | B41J 2/175 |

* cited by examiner

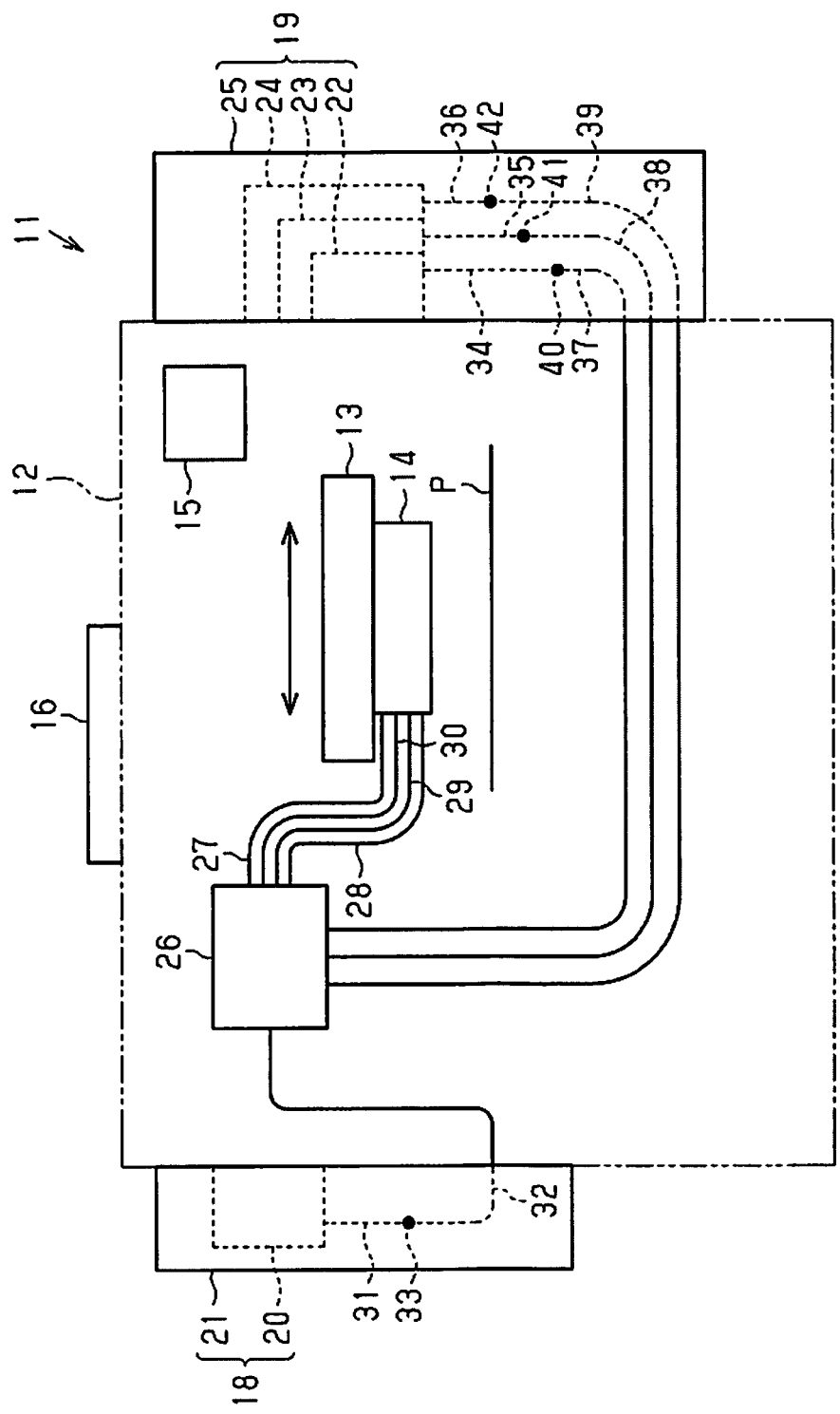

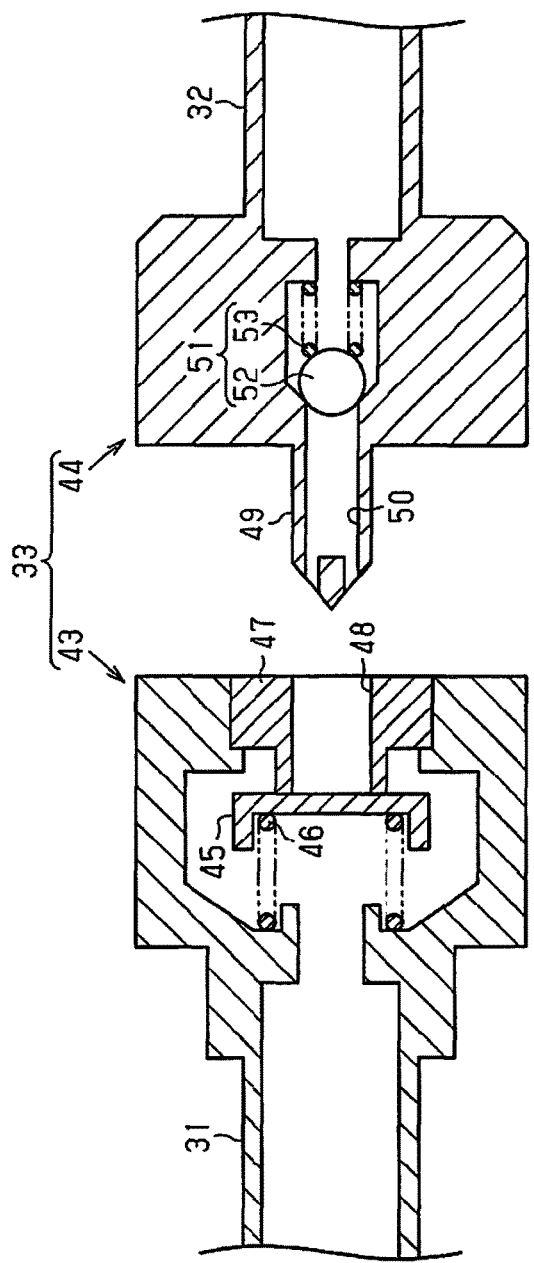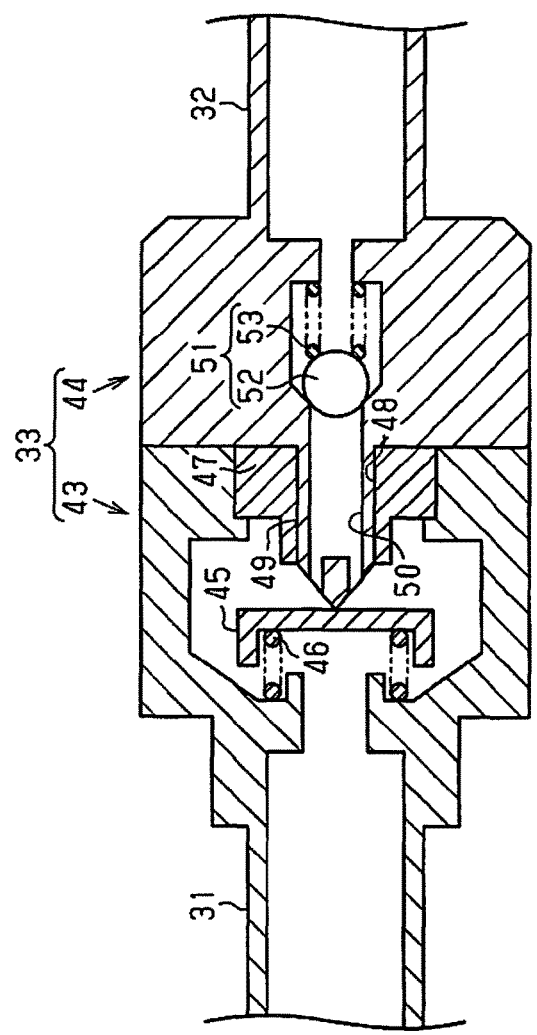
Fig. 2A
Fig. 2B

RECORDING APPARATUS

CROSS-REFERENCE TO RELATED APPLICATIONS

This U.S. National stage application of International Patent Application No. PCT/JP2015/004268, filed on Aug. 25, 2015, which, in turn, claims priority under 35 U.S.C. § 119(a) to Japanese Patent Application No. 2014-175121, filed in Japan on Aug. 29, 2014, the entire contents of which are hereby incorporated herein by reference.

TECHNICAL FIELD

The present invention relates to a recording apparatus.

PRIOR ART

In a recording apparatus such as an ink jet printer, recording is performed by a liquid being ejected with regard to a target from a liquid ejecting head which is provided in an inner section of a main housing of the recording apparatus. In this recording apparatuses, it is desirable for the liquid to be continuously and stably supplied with regard to the liquid ejecting head even in cases where a large amount of recording is being performed. In order for this to be realized, it is proposed that a liquid container section with a large capacity be provided on an outer section of the main housing of the recording apparatus and the liquid be supplied from the liquid container section to an inner section (on the liquid ejecting head side) of the main housing via a tube (refer to PTL 1).

Here, a configuration for the tube and the vicinity of the tube is adopted in the recording apparatus of PTL 1 in the following manner so that it is easy to assemble the tube for supplying the liquid inside the liquid container section to the liquid ejecting head which is in an inner section of the main housing. That is, the tube is divided up into a portion on the liquid container section side and a portion on the liquid ejecting head side in the longitudinal direction of the tube and each of these divided portions communication with each other due to being linked up by a connector which is fixed to an inner section of the main housing. Due to this configuration for the tube and the vicinity of the tube being adopted in this manner, it is easy to assemble the tube in the recording apparatus.

CITATION LIST

Patent Literature

PTL 1: Japanese Unexamined Patent Application Publication No. 2013-176946

SUMMARY OF THE INVENTION

Problems to be Solved by the Invention

In the recording apparatus of PTL 1, it is necessary for the liquid container section to be removed from the main housing in order for the liquid container section which is attached to an outer section of the main housing to not impede maintenance work during maintenance such as repair or replacement with regard to devices such as the liquid ejecting head which is in an inner section of the main housing. Furthermore, at this time, work is necessary at this time in order to separate the portion of the tube on the liquid container section side from the connector.

However, the attachability of the tube during manufacturing deteriorates due to the connector being fixed to an inner section of the main housing, and the work for separating the portion of the tube on the liquid container section side from the connector is difficult during maintenance. As a result, it is difficult to remove the liquid container section, which is attached to an outer section of the main housing, from the main housing when carrying out maintenance on inner sections of the main housing.

The purpose of the present invention is to propose a recording apparatus where it is possible to improve the attachability when a tube is attached during product manufacturing and the freedom in the layout of the tube pathways in inner sections of a housing and where it is possible to easily remove a liquid container section, which is attached to an outer section of a main housing, from the main housing when carrying out maintenance on inner sections of the main housing.

Means to Solve the Problems

Means to solve the problems described above and the operational effects thereof will be described below.

A recording apparatus which solves the problems described above are provided with a liquid ejecting head which is provided in an inner section of a main housing and which ejects a liquid with regard to a target and a liquid container section which is provided on an outer section of the main housing. Furthermore, the recording apparatus is provided with a first liquid supply tube where one end section side is connected to the liquid container section, a second liquid supply tube where one end section side is connected to the liquid ejecting head side, and a connection member which connects each of the other end section sides of the first liquid supply tube and the second liquid supply tube. Then, the connection member is configured by a first connection section which is provided on the first liquid supply tube side and a second connection section which is provided on the second liquid supply tube side. Furthermore, at least the first connection section of the connection member is provided so as to be positioned at an outer section of the main housing.

In the recording apparatus, the liquid container section, which is attached to an outer section of the main housing, is removed from the main housing when carrying out maintenance on devices such as the liquid ejecting head which is in an inner section of the main housing. At this time, connection using the connection member is released due to the other end section of the first liquid supply tube where the one end section side is connected with the liquid container section and the other end section of the second liquid supply tube where the one end section side is connected with the liquid ejecting head side are in a state of being connected to each other using the connection member. The other end section sides of the first liquid supply tube and the second liquid supply tube are connected to each other by linking the first connection section which is a portion of the connection member on the first liquid supply side with the second connection section which is a portion of the connection member on the second liquid supply side. For this reason, the connection between the other end section sides of the first liquid supply tube and the second liquid supply tube using the connection member is released by the first connection section being separated from the second connection section.

According to this configuration, in the connection member for connecting the other end section sides of the first liquid supply tube and the second liquid supply tube, at least the first connection section is provided so as to be positioned at an outer section of the main housing. For this reason, at least the first connection section in the connection member is exposed to an outer section of the main housing and it is possible to easily separate the first connection section and the second connection section by the first connection section being pulled away from the second connection section. Since it is possible to easily perform the work of separating the first connection section from the second connection section in this manner, it is possible for the connection between the other end section sides of the first liquid supply tube and the second liquid supply tube using the connection member to be released through simple working, and it is easy for the liquid container section to be removed from the main housing in accompaniment with the connection being released. Accordingly, it is possible to easily remove the liquid container section, which is attached to an outer section of the main housing, from the main housing when carrying out maintenance on inner sections of the main housing.

In addition, attachability when attaching the tube during product manufacturing is improved due to it being easy to link the first connection section and the second connection section of the connection member during product manufacturing, in other words, the connection between the other end section sides of the first liquid supply tube and the second liquid supply tube is easy. Furthermore, the second liquid supply tube need not be moved if the connection between the first connection section and the second connection section of the connection member is released when the liquid container section is removed from the main housing in order to carry out maintenance or the like. For this reason, the freedom in the layout of the tube pathways in inner sections of the housing is improved to the extent that the layout of the pathways for the second liquid supply tube need not be set in inner sections of the main housing so as to factor in movement of the second liquid supply tube.

As one aspect of the recording apparatus, it is possible to consider providing a container casing which contains the liquid container section on an outer section of the main housing and providing at least the first connection section of the connection member so as to be positioned in inner sections of the container casing which is provided on an outer section of the main housing.

In this case, it is preferable that an opening be formed in the main housing so that at least the first connection section of the connection member is exposed inside the container casing and the position of the opening be set so that the opening is at a position so as to expose toward the outside of the container casing when a cover for the container casing is removed.

According to this configuration, it is possible for the first connection section to be easily pulled away from the second connection section since at least the first connection section of the connection member is in a state of being exposed via the opening in the main housing and the container casing when the cover for the container casing is removed with the intention of removing the container casing (the liquid container section) from the main housing.

Here, it is not always necessary for the first connection section and the like to be positioned inside the container casing as described above and the first connection section and the like may be positioned at an outer section of the container casing when at least the first connection section of the connection member is provided so as to be positioned at an outer section of the main housing.

As one aspect of the recording apparatus, it is possible to consider providing of sealing members, which seal the first liquid supply tube and the second liquid supply tube when the connection between the other end section sides of the first liquid supply tube and the second liquid supply tube using the first connection section and the second connection section is released, at an end section of the first liquid supply tube on the first connection section side and at an end section of the second liquid supply tube on the second connection section side.

According to this configuration, when the connection between the other end section sides of the first liquid supply tube and the second liquid supply tube using the first connection section and the second connection section is released, it is possible to suppress leakage of liquid from the other end section sides of the first liquid supply tube and the second liquid supply tube using the sealing members.

As one aspect of the recording apparatus, it is possible to consider further providing a valve mechanism which has a valve body which is able to be displaced between a sealing position for sealing an opening in one of end sections out of an end section of the first liquid supply tube on the first connection section side and an end section of the second liquid supply tube on the second connection section side and an open position for opening the opening in the one end section, and a pressing section which press the valve body toward the sealing position. In this case, the valve mechanism is configured so that the valve body is held at the open position against pressing force of the pressing section when the first connection section and the second connection section are in a state of being connected and holding of the valve body at the open position is released when the first connection section and the second connection section are separated. Furthermore, the valve mechanism has a check valve which is provided at the end section which is the opposite of the end section where the opening is sealed using the valve body. The check valve is configured so as to permit only flow of liquid from the liquid container section side to the liquid ejecting head side.

According to this configuration, holding of the valve body at the open position is released and the valve body is displaced to the sealing position due to the pressing force of the pressing section when connection between the other end section sides of the first liquid supply tube and the second liquid supply tube to each other using the first connection section and the second connection section is released by separating of the first connection section and the second connection section. Due to this, it is possible to seal the opening in the one end section out of the end section of the first liquid supply tube on the first connection section side and the end section of the second liquid supply tube on the second connection section side using the valve body, and it is possible to suppress leakage of liquid from the opening using the sealing members. In addition, there is a tendency for the liquid to flow from the liquid ejecting head side to the liquid container section side at the end section which is the opposite of the end section where the opening is sealed using the valve body out of the end section of the first liquid supply tube on the first connection section side and the end section of the second liquid supply tube on the second connection section side when the first connection section and the second connection section are separated. However, since the flow of liquid is stopped by the check valve, it is possible to suppress liquid leaking from the opening of the opposite end section using the check valve.

As one aspect of the recording apparatus, it is possible to consider providing a detecting unit, which detects that the connection between the first connection section and the second connection section is released, in the connection member and providing a control section which executes a blocking process for blocking flow of liquid from the liquid container section side to the liquid ejecting head side when releasing of the connection between the first connection section and the second connection section is detected using the detecting unit.

According to this configuration, the flow of liquid from the liquid container section side to the liquid ejecting head side is blocked through executing of the blocking process when connection between the first connection section and the second connection section is erroneously released with the recording apparatus being in a state where the power source is turned on. Accordingly, in a state where the connection between the first connection section and the second connection section is erroneously released, it is possible to avoid liquid flowing from the liquid container section side to the liquid ejecting head side.

As one aspect of the recording apparatus, it is possible to consider providing a detecting unit, which is for detecting that the connection between the first connection section and the second connection section is released, in the second connection section and providing an information transmitting section for carrying out notification that releasing of the connection between the first connection section and the second connection section is detected using the detecting unit when the releasing of the connection is detected.

According to this configuration, when connection between the first connection section and the second connection section is erroneously released with the recording apparatus being in a state where the power source is turned on, notification is carried out using the information transmitting section when releasing of the connection is detected by the detecting unit. Due to this, it is possible for an operator to be informed that the connection between the first connection section and the second connection section is released and to prompt the operator to take action.

BRIEF DESCRIPTION OF THE DRAWINGS

FIG. 1 is a schematic diagram illustrating inner sections and peripheral structures of a main housing of a recording apparatus.

FIGS. 2A and 2B are cross sectional diagrams illustrating the structures for a first connection section and a second connection section.

DESCRIPTION OF THE EMBODIMENTS

[First Embodiment]

Figure 3A:
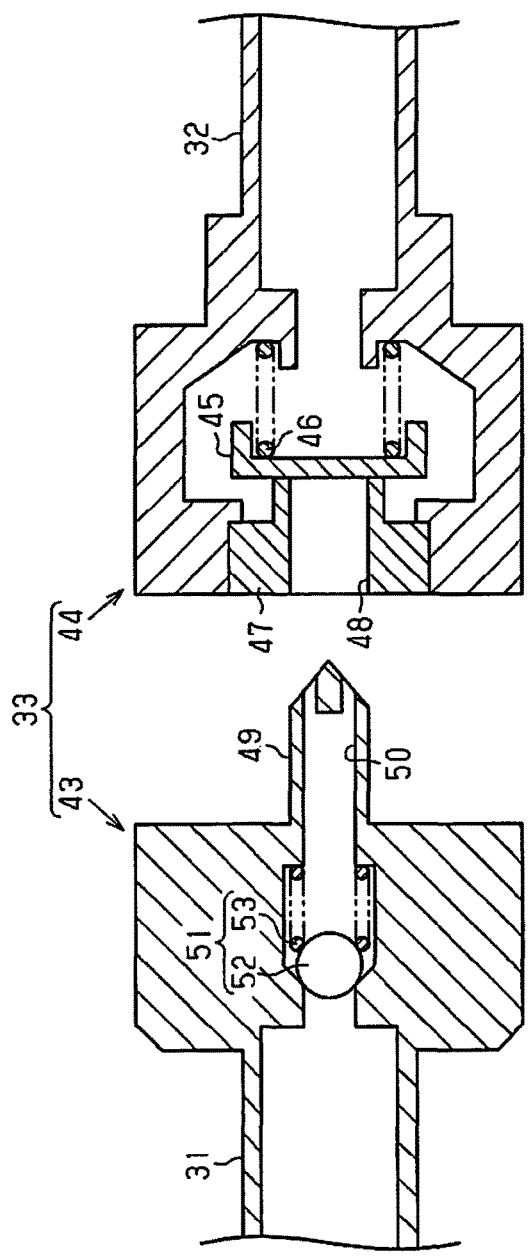
FIGS. 3A and 3B are cross sectional diagrams illustrating another example of structures for a first connection section and a second connection section.

A first embodiment where a recording apparatus is embodied as an ink jet printer will be described below with reference to FIG. 1 to FIG. 7.

FIG. 1 schematically illustrates inner sections and peripheral structures of a main housing 12 of a recording apparatus 11. A carriage 13 which moves back and forth in the left and right direction of the diagram is provided in an inner section of the main housing 12. A liquid ejecting head 14, which performs printing (recording) by ejecting ink (liquid) with regard to a target on printing paper P which is transported inside the main housing 12, is supported by the carriage 13. Here, a control section 15 which administers various types of controlling over the recording apparatus 11 and an operating panel 16 which is operated by a user are provided in the recording apparatus 11.

A liquid container unit 18 is provided on the left side surface of the main housing 12. The liquid container unit 18 is provided with an ink tank 20 which functions as a liquid container section which holds black ink and a container casing 21 where the ink tank 20 is contained. It is possible for the ink tank 20 and the container casing 21 (the liquid container unit 18) to be attached and detached with regard to the left side surface of the main housing 12.

On the other hand, a liquid container unit 19 is provided on the right side surface of the main housing 12. The liquid container unit 19 is provided with a plurality of ink tanks 22 to 24 which function as liquid container sections which holds color inks and a container casing 25 where the ink tanks 22 to 24 are contained. Color inks such as cyan ink, magenta ink, and yellow ink are respectively held in the ink tanks 22 to 24. It is possible for the ink tanks 22 to 24 and the container casing 25 (the liquid container unit 19) to be attached and detached with regard to the right side surface of the main housing 12.

Next, the configuration, where the ink inside the ink tanks 20 and 22 to 24 is supplied to the liquid ejecting head 14 which is provided in an inner section of the main housing 12, will be described.

A relay unit 26 which has a function as a sub tank for retaining ink which is to be supplied to the liquid ejecting head 14 is provided in an inner section of the main housing 12. It is possible for the relay unit 26 to separately retain black ink, cyan ink, magenta ink, and yellow ink, and the relay unit 26 is linked with the liquid ejecting head 14 via a plurality of relay tubes 27 to 30 which correspond to each of the inks.

One end section side of a first liquid supply tube 31 is connected to the ink tank 20 which is provided on the left side of the main housing 12. In addition, one end section of a second liquid supply tube 32 is connected to the relay unit 26. The one end section of the second liquid supply tube 32 is connected to the liquid ejecting head 14 side via the relay unit 26 and the relay tube 27. Here, it is not always necessary for the one end section of the second liquid supply tube 32 to be indirectly connected with regard to the liquid ejecting head 14 via the relay unit 26 and the relay tube 27, and the one end section of the second liquid supply tube 32 may be direct connected.

Then, the other end section sides of the first liquid supply tube 31 and the second liquid supply tube 32 are connected to each other using a connection member 33. Accordingly, the black ink inside the ink tank 20 is supplied to the liquid ejecting head 14 through the first liquid supply tube 31 and the second liquid supply tube 32 (through the relay unit 26 and the relay tube 27 in this example).

First liquid supply tubes 34 to 36 are connected to the ink tanks 22 to 24 which are provided on the right side of the main housing 12. In addition, one end sections of second liquid supply tubes 37 to 39 are connected to the relay unit 26. The one end sections of the second liquid supply tubes 37 to 39 are connected to the liquid ejecting head 14 side via the relay unit 26 and relay tubes 28 to 30. Here, it is not always necessary for the one end sections of the second liquid supply tubes 37 to 39 to be indirectly connected with regard to the liquid ejecting head 14 via the relay unit 26 and relay tubes 28 to 30, and the one end sections of the second liquid supply tubes 37 to 39 may be direct connected.

Then, the other end sides of the first liquid supply tubes 34 to 36 and the second liquid supply tubes 37 to 39 are connected to each other using connection members 40 to 42. Accordingly, the color ink inside the ink tank 22 (for example, cyan ink) is supplied to the liquid ejecting head 14 through the first liquid supply tube 34 and the second liquid supply tube 37 (through the relay unit 26 and the relay tube 28 in this example). In addition, the color ink inside the ink tank 23 (for example, magenta ink) is supplied to the liquid ejecting head 14 through the first liquid supply tube 35 and the second liquid supply tube 38 (through the relay unit 26 and the relay tube 29 in this example). Furthermore, the color ink inside the ink tank 24 (for example, yellow ink) is supplied to the liquid ejecting head 14 through the first liquid supply tube 36 and the second liquid supply tube 39 (through the relay unit 26 and the relay tube 30 in this example).

Next, the structures of the connection members 33 and 40 to 42 will be described. Here, since the structures of the connection members 33 and 40 to 42 are the same, only the connection member 33 will be described below in detail.

As shown in FIG. 2A, the connection member 33 is configured using a first connection section 43 which is provided at the other end section (the right end in the diagram) of the first liquid supply tube 31 and a second connection section 44 which is provided at the other end section (the left end in the diagram)of the second liquid supply tube 32.it is possible for the first connection section 43 and the second connection section 44 to be connected by one being brought closer to the other and for the connection to be released by one being separated from the other. Through the connection and the releasing of the connection between the first connection section 43 and the second connection section 44 using the connection member 33 in this manner, the other end sections of the first liquid supply tube 31 and the second liquid supply tube 32 are connected and separated.

The connection member 33 is provided with a valve mechanism which seals and opens an opening in an end section of the first liquid supply tube 31 on the first connection section 43 side and an opening in an end section of the second liquid supply tube 32 on the second connection section 44 side. The valve mechanism has a valve body 45, which is able to be displaced between a sealing position for sealing the opening at one of the end sections out of the end section of the first liquid supply tube 31 on the first connection section 43 side and the end section of the second liquid supply tube 32 on the second connection section 44 side, and an open position for opening the openings at the end sections and a spring 46 which is a pressing section which presses the valve body 45 toward the sealing position. Here, in this example, the valve body 45 and the spring 46 are provided in an inner section of the first connection section 43 which is linked with an inner section of the first liquid supply tube 31, and the opening in the end section of the first liquid supply tube 31 on the first connection section 43 side is sealed or opened using the valve body 45 and the spring 46.

In detail, the spring 46 and the valve body 45 are inserted in order from the opening into an inner section of the first connection section 43 and a packing 47 is fitted into the opening in this state. A hole 48 for communicating with the outside and with an inner section of the first liquid supply tube 31 (the first connection section 43) is formed in the packing 47. Then, in an inner section of the first connection section 43, the hole 48 in the packing 47 is closed off using the valve body 45 by the valve body 45 being pushed toward the packing 47 due to the pressing force of the spring 46. At this time, the valve body 45 is in a state of being displaced to the sealing position and the opening in the end section of the first liquid supply tube 31 on the first connection section 43 side is sealed using the valve body 45.

In addition, a cylindrical section 49 is formed so as to protrude in the second connection section 44 which is linked with an inner section of the second liquid supply tube 32. The tip end section of the cylindrical section 49 is formed into a conical shape and a communication path 50 is formed in an inner section of the cylindrical section 49 as an opening at the tip end section and is linked with an inner section of the liquid supply tube 32. Then, the cylindrical section 49 of the second connection section 44 is inserted into the hole 48 in the packing 47 when the first connection section 43 and the second connection section 44 are connected. Then, the hole 48 in the packing 47 changes from a state of being closed off by the valve body 45 to a state of being open by the valve body 45 being displaced to the left side in the diagram against the pressing force of the spring 46 due to pressurization at the tip end section of the cylindrical section 49.

FIG. 2B illustrates a state where the first connection section 43 and the second connection section 44 are connected. In this state, the tip end section of the cylindrical section 49 which is inserted into the hole 48 in the packing 47 pressurizes the valve body 45 and this displaces the valve body 45 to the open position against the pressing force of the spring 46. The opening in the end section of the first liquid supply tube 31 on the first connection section 43 side is opened due to the valve 45 being displaced to (being held at) the open position in this manner. In addition, the valve body 45 is displaced to the sealing position (the position in FIG. 2A) due to the pressing force of the spring 46 by holding of the valve body 45 at the open position due to pressurizing from the cylindrical section 49 being released when the first connection section 43 and the second connection section 44 which are in a connection state are separated as shown in FIG. 2A.

The valve mechanism has a check valve 51 which is provided in an inner section of the communication path 50 of the second connection section 44. The check valve 51 is provided at an end section (of the second connection section 44 in this example) which is the opposite of the end section (of the first connection section 43 in this example) where the opening is sealed using the valve body 45 out of the end section of the first liquid supply tube 31 on the first connection section 43 side and the end section of the second liquid supply tube 32 on the second connection section 44 side. The check valve 51 is configured so as to permit only the flow of ink from the ink tank (the ink tank 20 in FIG. 1 in this example) side to the liquid ejecting head 14 side.

That is, the check valve 51 is provided with a spherical valve body 52 which communicates with or blocks the communication path 50 and a spring 53 which presses the valve body 52 toward a position which blocks the communication path 50. A force acts on the valve body 52 based on the difference in pressure between the pressure at a portion of the communication path 50 on the ink tank 20 side (the left side in FIG. 2B) and the pressure at a portion of the communication path 50 on the liquid ejecting head 14 side (the right side in FIG. 2B), and the pressing force of the spring 53 also acts on the valve body 52. Then, when the force based on the difference in pressure acts in the same direction as the pressing force, the valve body 52 is held at a position which is a state where the communication path 50 is blocked. In addition, when the force based on the difference in pressure acts against the pressing force and the force based on the difference in pressure is smaller than the pressing force, the valve body 52 is held at a position which is a state where the communication path 50 is blocked. On the other hand, when the force based on the difference in pressure acts against the pressing force and the force based on the difference in pressure is larger than the pressing force, the valve body 52 is displaced in a direction (the right direction in FIG. 2B) so as to be in a state of communicating with the communication path 50 against the pressing force.

Due to the operations of the check valve 51 described above, only the flow of ink from the ink tank 20 side to the liquid ejecting head 14 side is permitted in the communication path 50 of the second connection section 44. That is, an operation to open the check valve 51 in order to permit only the flow of ink from the ink tank 20 side to the liquid ejecting head 14 side in the communication path 50 is generated based on, for example, ejecting of ink from the liquid ejecting device 14 being performed. When ejecting of ink from the liquid ejecting device 14 is performed in this manner, there are circumstances where the force based on the difference in pressure acts against the pressing force and the force based on the difference in pressure is larger than the pressing force, and there is an operation to open the check valve 51 based on this.

Figure 3B:
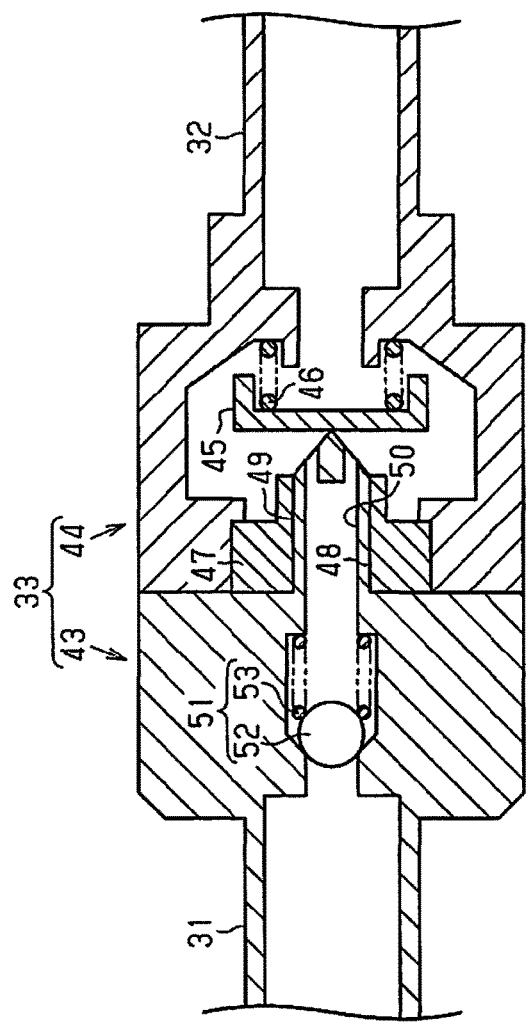
Figure 4:
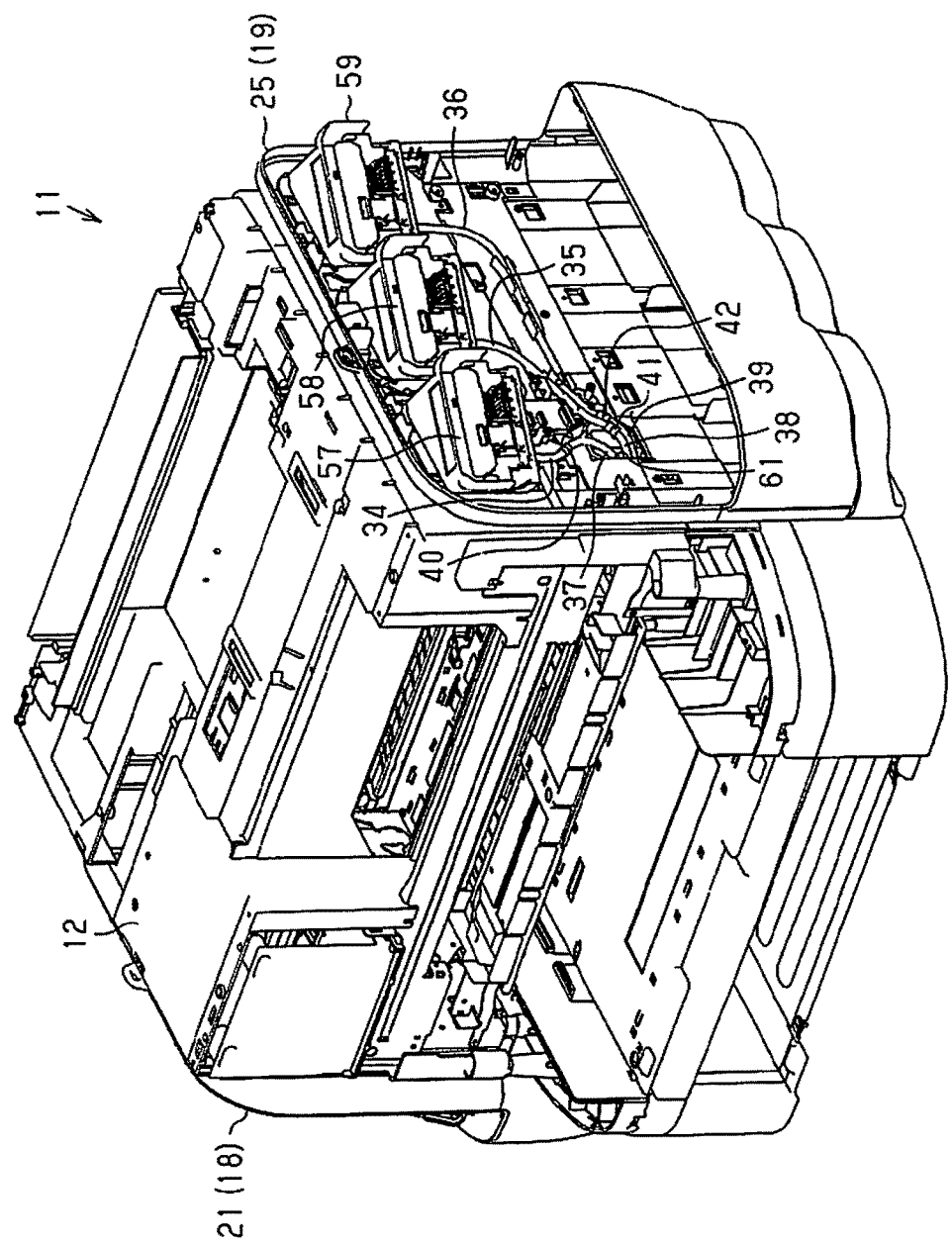
FIG. 4 is a perspective diagram illustrating the main housing where a container casing is attached.

Here, FIGS. 3A and 3B illustrate examples of a structure where the structures of the first connection section 43 and the second connection section 44 are swapped. The structures in the inner sections of the first connection section 43 and the second connection section 44 may be swapped in this manner. In this case, the valve body 45, the spring 46, and the packing 47 are provided in the second connection section 44, and the cylindrical section 49, the communication path 50, and the check valve 51 are provided in the first connection section 43. Here, in this case, the positional relationship between the valve body 45 and the spring 46 is the reverse of the positional relationship in FIGS. 2A and 2B such that only the flow of ink from the ink tank 20 side to the liquid ejecting head 14 side is permitted in the check valve 51.

Next, the structure in the periphery of the main housing 12 and the container casings 21 and 25 of the recording apparatus 11 will be described.

FIGS. 4 to 7 are a perspective diagram illustrating the main housing 12 where the container casings 21 and 25 are attached, a front surface diagram illustrating the main housing 12, a left side surface diagram illustrating the main housing 12, and a right side surface diagram illustrating the main housing 12.

Figure 5:
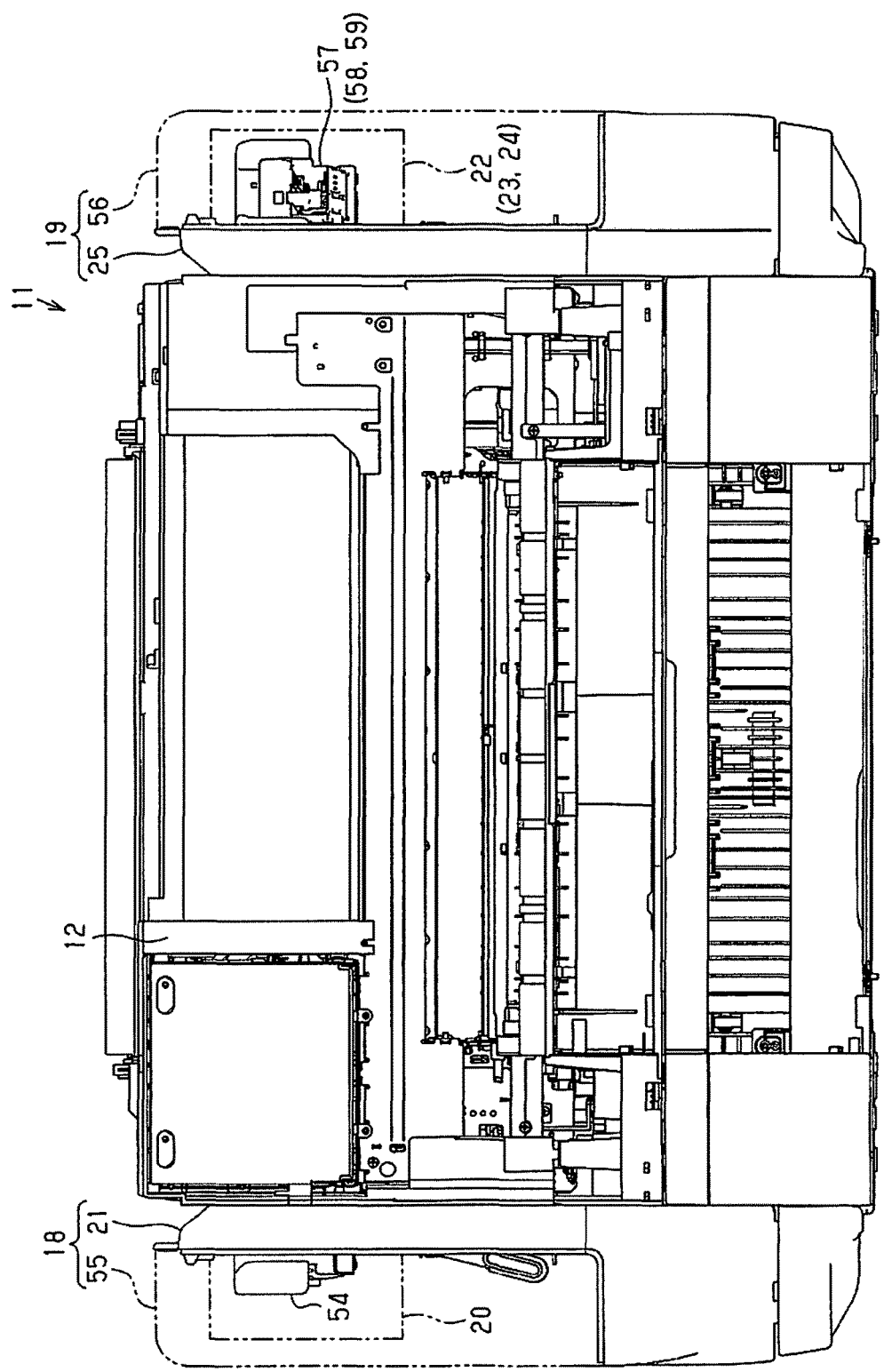
FIG. 5 is a front surface diagram illustrating the main housing.
Figure 6:
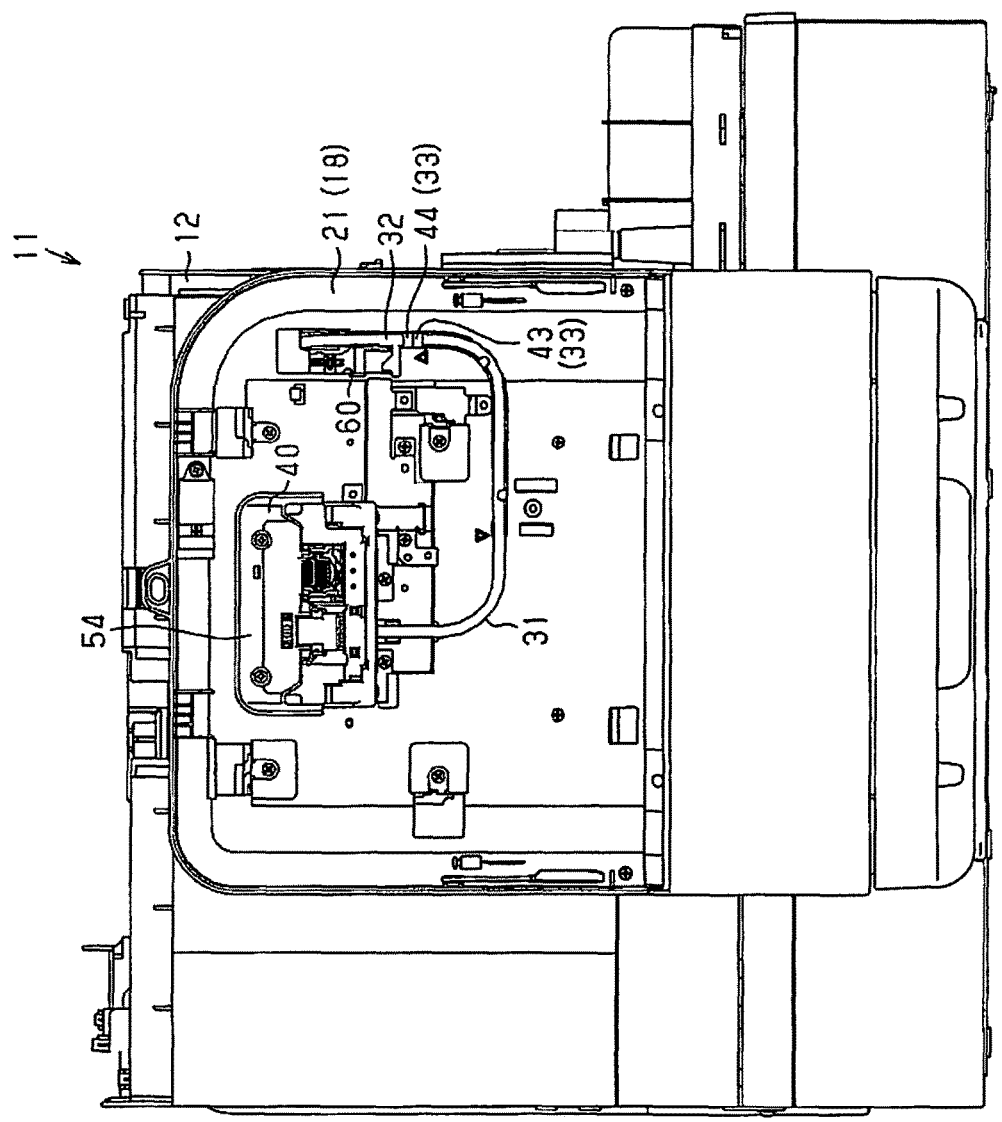
FIG. 6 is a left side surface diagram illustrating the main housing.

As shown in FIGS. 5 and 6, the container casing 21 which is provided on the left side surface of the main housing 12 is provided with a cover 55 (FIG. 5) which is able to be removed so that it is possible for an inner section of the container casing 21 to be exposed. In addition, a locking section 54 for locking the ink tank 20 is provided in an inner section of the container casing 21. It is possible for the ink tank 20 (FIG. 5) to be removed from the locking section 54. In addition, it is possible for the container casing 21 to be attached and detached with regard to the main housing 12 in a state where the ink tank 20 is locked in place by the locking section 54. The one end section of the first liquid supply tube 31 (FIG. 6) is attached to the locking section 54, and the one end section of the first liquid supply tube 31 is connected to the ink tank 20 when the ink tank 20 is locked in place by the locking section 54.

The other end section of the first liquid supply tube 31 is linked with the second liquid supply tube 32 using the connection member 33. On the other hand, an opening 60 is formed in the left side surface of the main housing 12, and the second liquid supply tube 32 extends into an inner section of the main housing 12 through the opening 60. The one end section of the second liquid supply tube 32 is linked with the liquid ejecting head 14 side (to be precise, the relay unit 26) which is in an inner section of the main housing 12 (FIG. 1). Then, the other end section of the second liquid supply tube 32 is linked with the other end section of the first liquid supply tube 31 using the connection member 33. At least the first connection section 43 (both the first connection section 43 and the second connection section 44 in this example) of the connection member 33 is provided so as to be positioned at an outer section of the main housing 12.

Here, the opening 60 in the main housing 12 functions as an opening which exposes at least the first connection section 43 (both the first connection section 43 and the second connection section 44 in this example) of the connection member 33 to an outer section of the main housing 12 and to an inner section of the container casing 21. Then, the position of the opening 60 in the main housing 12 is set so as to be a position where the opening 60 exposes toward the outside of the container casing 21 when the cover 55 for the container casing 21 is removed.

Figure 7:
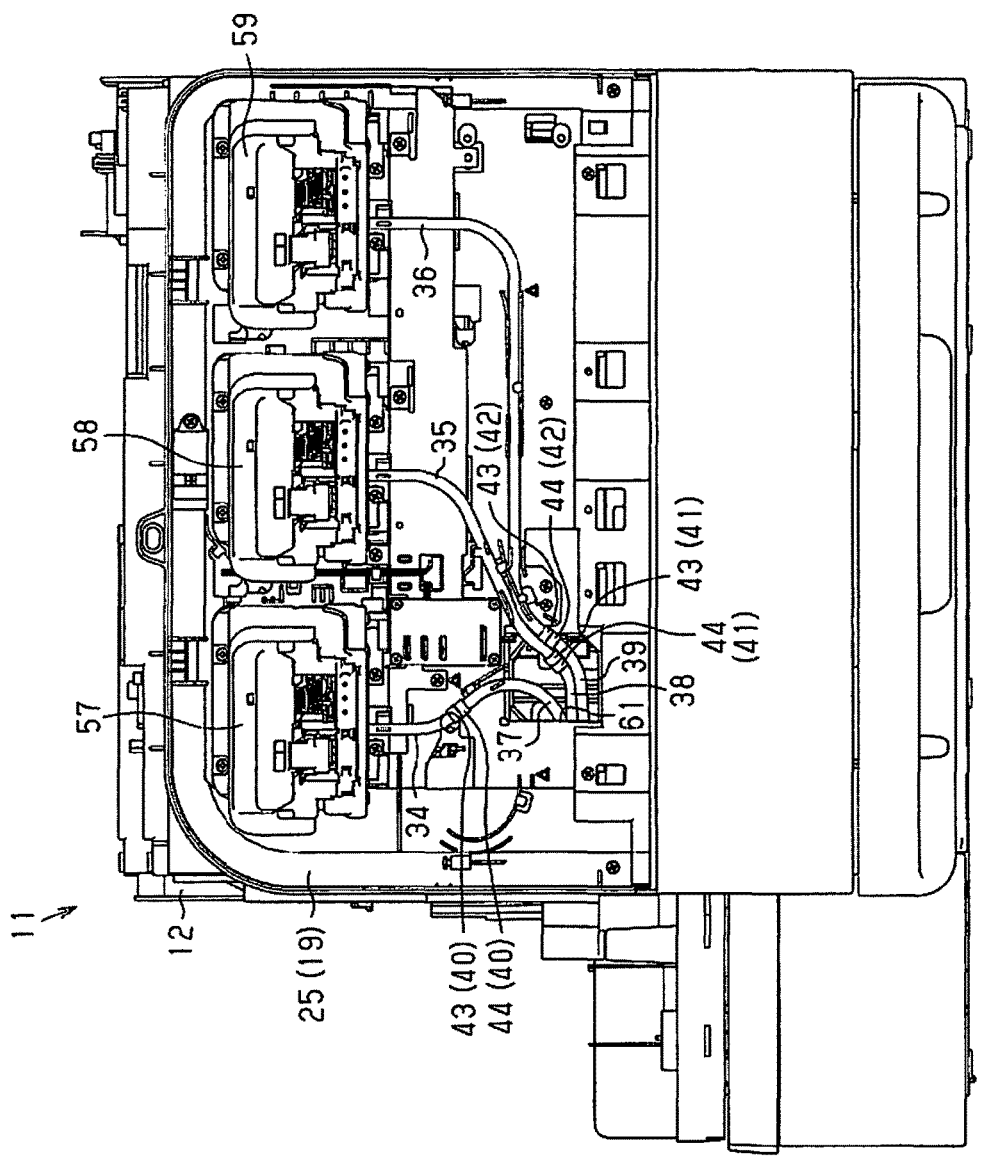
FIG. 7 is a right side surface diagram illustrating the main housing.

As shown in FIGS. 5 and 7, the container case 25 which is provided on the right side surface of the main housing 12 is provided with a cover 56 (FIG. 5) which is able to be removed so that it is possible for an inner section of the container casing 25 to be exposed. In addition, locking sections 57 to 59 for locking the ink tanks 22 to 24 (FIG. 5) are provided in an inner section of the container casing 25. It is possible for the ink tanks 22 to 24 to be removed from the locking sections 57 to 59. The one end sections of the first liquid supply tubes 34 to 36 (FIG. 7) are attached to the locking sections 57 to 59, and the one end sections of the first liquid supply tubes 34 to 36 are connected to the ink tanks 22 to 24 when the tanks 22 to 24 are locked in place by the locking sections 57 to 59.

The other end sections of the first liquid supply tubes 34 to 36 are linked with the second liquid supply tubes 37 to 39 using the connection members 40 to 42. On the other hand, an opening 61 is formed in the right side surface of the main housing 12 which is shown in FIG. 7, and the second liquid supply tubes 37 to 39 extend to an inner section of the main housing 12 through the opening 61. The one end sections of the second liquid supply tubes 37 to 39 are linked with the liquid ejecting head 14 side (to be precise, the relay unit 26) which is in an inner section of the main housing 12 (FIG. 1). Then, the other end sections of the second liquid supply tubes 37 to 39 are linked with the other end sections of the first liquid supply tubes 34 to 36 using the connection members 40 to 42. At least the first connection sections 43 (both the first connection sections 43 and the second connection sections 44 in this example) of the connection members 40 to 42 are provided so as to be positioned at outer sections of the main housing 12.

Here, the opening 61 in the main housing 12 functions as an opening which exposes at least the first connection sections 43 (both the first connection sections 43 and the second connection sections 44 in this example) of the connection members 40 to 42 to outer sections of the main housing 12 and to an inner section of the container casing 25. Then, the position of the opening 61 in the main housing 12 is set so as to be a position where the opening 60 exposes toward the outside of the container casing 25 when the cover 56 for the container casing 25 is removed.

Next, the actions of the recording apparatus 11 will be described.

The container casing 21 (the ink tank 20) and the container casing 25 (the ink tanks 22 to 24) which are provided at outer sections of the main housing 12 are removed from the main housing 12 when maintenance is carried out on devices such as the liquid ejecting head 14 which is in an inner section of the main housing 12 in the recording apparatus 11.

The other end section of the first liquid supply tube 31 where the one end section side is connected to the ink tank 20 and the other end section of the second liquid supply tube 32 where the one end section side is connected to the liquid ejecting head 14 side are in a state of being connected to each other using the connection member 33 when the container casing 21 (the ink tank 20) is removed from the main housing 12. In detail, the other end section sides of the first liquid supply tube 31 and the second liquid supply tube 32 are connected to each other due to linking of the first connection section 43 which is a portion of the connection member 33 on the first liquid supply tube 31 side with the second connection section 44 which is a portion of the connection member 33 on the second liquid supply tube 32 side as shown in FIG. 2B.

For this reason, connection between the other end sections of the first liquid supply tube 31 and the second liquid supply tube 32 using the connection member 33 is released when the container casing 21 (the ink tank 20) is removed from the main housing 12.

In detail, the cover 55 (FIG. 5) is removed from the container case 21. When the cover 55 is removed from the container case 21 in this manner, the opening 60 which is formed on the left side surface of the main housing 12 exposes toward the outside of the container casing 21. The opening 60 is for exposing at least the first connection section 43 (both the first connection section 43 and the second connection section 44 in this example) of the connection member 33 to an outer section of the main housing 12 and an inner section of the container casing 21. On the basis of this state, connection between the other end section sides of the first liquid supply tube 31 and the second liquid supply tube 32 using the connection member 33 is released due to both of the other end section sides being separated by the first connection section 43 being pulled away from the second connection section 44 as shown in FIG. 2A.

In addition, the other end sections of the first liquid supply tubes 34 to 36 where the one end section sides are connected to the ink tank 22 to 24 and the other end sections of the second liquid supply tubes 37 to 39 where the one end section sides are connected to the liquid ejecting head 14 side are in a state of being connected to each other using the connection members 40 to 42 when the container casing 25 (the ink tanks 22 to 24) is removed from the main housing 12. Due to the connection members 40 to 42 having the same configuration as the connection member 33, connection between the other end section sides of the first liquid supply tubes 34 to 36 and the second liquid supply tubes 37 to 39 using the connection members 40 to 42 is released with the same sequence as with the connection member 33.

In detail, the cover 56 (FIG. 5) is removed from the container casing 25. When the cover 56 is removed from the container case 25 in this manner, the opening 61 which is formed on the right side surface of the main housing 12 exposes toward the outside of the container casing 25. The opening 61 is for exposing at least the first connection sections 43 (both the first connection sections 43 and the second connection sections 44 in this example) of the connection members 40 to 42 to outer sections of the main housing 12 and an inner section of the container casing 25. On the basis of this state, connection between the other end section sides of the first liquid supply tubes 34 to 36 and the second liquid supply tubes 37 to 39 using the connection members 40 to 42 is released due to all of the other end section sides being separated by the first connection sections 43 being pulled away from the second connection sections 44.

In the connection members 33 and 40 to 42 which are for connecting the other end section sides of the first liquid supply tubes 31 and 34 to 36 and the second liquid supply tubes 32 and 37 to 39 in the recording apparatus 11, at least the connection sections 43 are provided so as to be positioned at outer sections of the main housing 12 and at inner sections of the container casings 21 and 25. For this reason, at least the connection sections 43 of the connection members 33 and 40 to 42 are exposed to outer sections of the main housing 12 and inner sections of the container casings 21 and 25, and it is possible for the first connection section 43 to be easily pulled away from the second connection section 44 and it is possible for the first connection section 43 to be separated from the second connection section 44 as a result.

Since it is possible to easily perform the working of separating the first connection section 43 and the second connection section 44 in this manner, it is possible to release the connection between the other end section sides of the first liquid supply tubes 31 and 34 to 36 and the second liquid supply tubes 32 and 37 to 39 using the connection members 33 and 40 to 42 through simple working. For this reason, it is easy to remove the container casing 21 (the ink tank 20) and the container casing 25 (the ink tanks 22 to 24) from the main housing 12.

According to the present embodiment which is described above, the following effects are able to be obtained.

(1) In the recording apparatus 11, it is possible to easily remove the container casing 21 (the ink tank 20) and the container casing 25 (the ink tanks 22 to 24), which are attached to outer sections of the main housing 12, from the main housing 12 when carrying out maintenance on inner sections of the main housing 12. In addition, it is easy for the first connection sections 43 and the second connection sections 44 of the connection members 33 and 34 to 36 to be linked up during manufacturing of the recording apparatus 11, in order words, attachability when attaching the tubes during product manufacturing of the recording apparatus 11 is improved due to the connection between the other end section sides of the first liquid supply tubes 31 and 34 to 36 and the second liquid supply tubes 32 and 37 to 39 being easy. Furthermore, the second liquid supply tubes 32 and 37 to 39 need not be moved if the connection between the first connection sections 43 and the second connection sections 44 of the connection members 33 and 34 to 36 is released when the container casing 21 (the ink tank 20) and the container casing 25 (the ink tanks 22 to 24) are removed from the main housing 12 in order to carry out maintenance or the like. For this reason, the freedom in the layout of tube pathways in inner sections of the housing is improved to the extent that the layout of the pathways for the second liquid supply tubes 32 and 37 to 39 need not be set in inner sections of the main housing 12 so as to factor in movement of the second liquid supply tubes 32 and 37 to 39.

(2) It would be possible to remove the container casing 21 (the ink tank 20) and the container casing 25 (the ink tanks 22 to 24) from the main housing 12 while maintaining the connection state if the ink tanks 20 and 22 to 25 and the liquid ejecting head 14 side (to be precise, the relay unit 26) were to be connected by a long liquid supply tube. That is, it would be possible to remove the container casing 21 (the ink tank 20) and the container casing 25 (the ink tanks 22 to 24) from the main housing 12 without providing the first liquid supply tubes 31 and 34 to 36, the second liquid supply tubes 32 and 37 to 39, and the connection members 33 and 40 to 42. However, when the container casing 21 (the ink tank 20) and the container casing 25 (the ink tanks 22 to 24) are removed from the main housing 12 in this case, it is necessary to secure space for storing the long liquid supply tube in the main housing 12. It is possible to avoid this problem from occurring.

(3) At least the first connection sections 43 of the connection members 33 and 40 to 42 are in a state of being exposed via the container casings 21 and 25 and the openings 60 and 61 which are formed in the main housing 12 when the covers 55 and 56 for the container casings 21 and 25 are removed. For this reason, it is possible for the first connection section 43 to be easily pulled away from the second connection sections 44 in the connection members 33 and 40 to 42.

(4) The valve mechanisms in the connection members 33 and 40 to 42 are operated in the following manner when the first connection sections 43 are pulled away from the second connection sections 44 in the connection members 33 and 40 to 42 so as to release the connection between the other end section sides of the first liquid supply tubes 31 and 34 to 36 and the second liquid supply tubes 32 and 37 to 39. That is, in the first connection section 43, holding of the valve body 45 at the open position is released and the valve body 45 is displaced to the sealing position due to the pressing force of the spring 46. As a result, it is possible for the opening on the first connection section 43 side to be sealed using the valve body 45 and it is possible to suppress leakage of liquid from the opening using the valve body 45. In addition, there is a tendency for the liquid to flow from the liquid ejecting head 14 side to the ink tank 20 and 22 to 24 sides in the second connection section 44 when the first connection section 43 and the second connection section 44 are separated. However, since the flow of liquid is stopped by the check valve 51, it is possible to suppress ink leaking from the opening at the end section of the second connection section 44 using the check valve 51.

[Second Embodiment]

Next, a second embodiment of the recording apparatus will be described with reference to FIGS. 8A and 8B to 10.

Figures 8A, 8B:
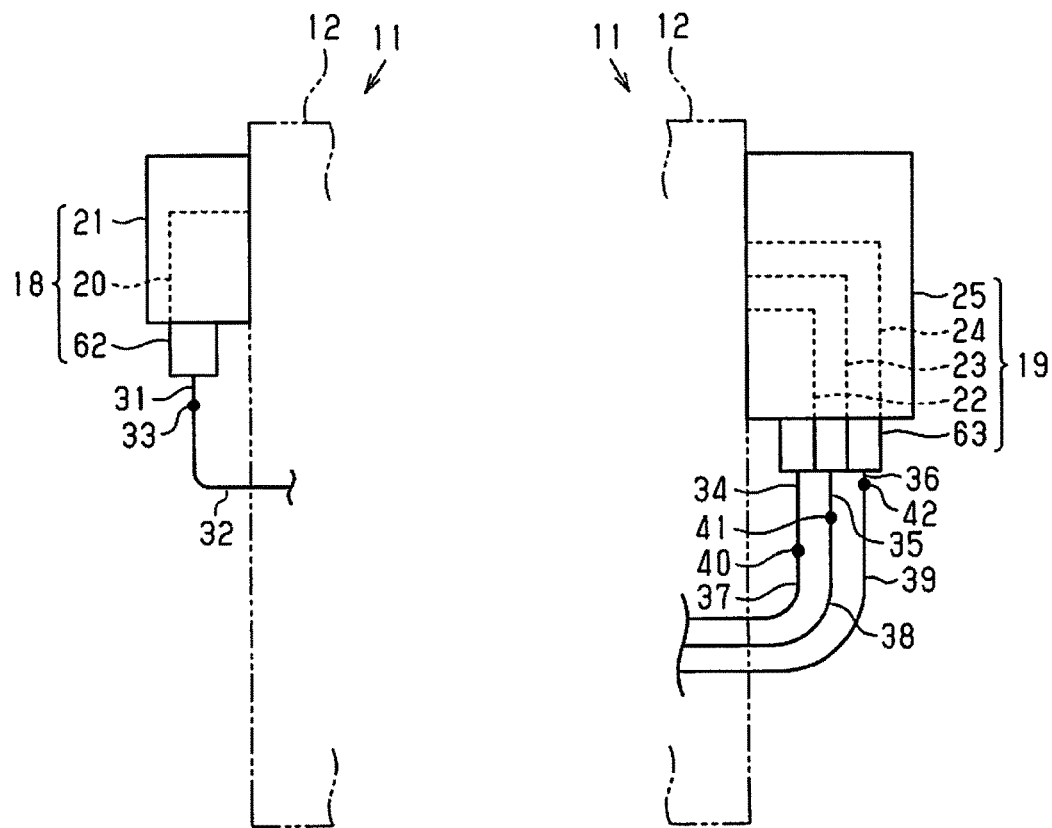
FIGS. 8A and 8B are schematic diagrams illustrating the periphery of a liquid container unit in a main housing of a recording apparatus.

As shown in FIGS. 8A and 8B, in the liquid container unit 18 of the recording apparatus 11 of the present embodiment, the one end section side of the first liquid supply tube 31 is linked with the ink tank 20 via a pump unit 62. In addition, in the liquid container unit 19, the one end section sides of the first liquid supply tubes 34 to 36 are linked with the ink tanks 22 to 24 via a pump unit 63.

The pump units 62 and 63 are for sending ink inside the ink tanks 20 and 22 to 24 to the liquid ejecting head 14 side (directly to the first liquid supply tubes 31 and 34 to 36) and is driven via the control section 15 (FIG. 1) of the recording apparatus 11. In addition, the pump units 62 and 63 have a mechanism for blocking the flow of ink from the ink tanks 20 and 22 to 24 side to the liquid ejecting head 14 side.

Figure 9:
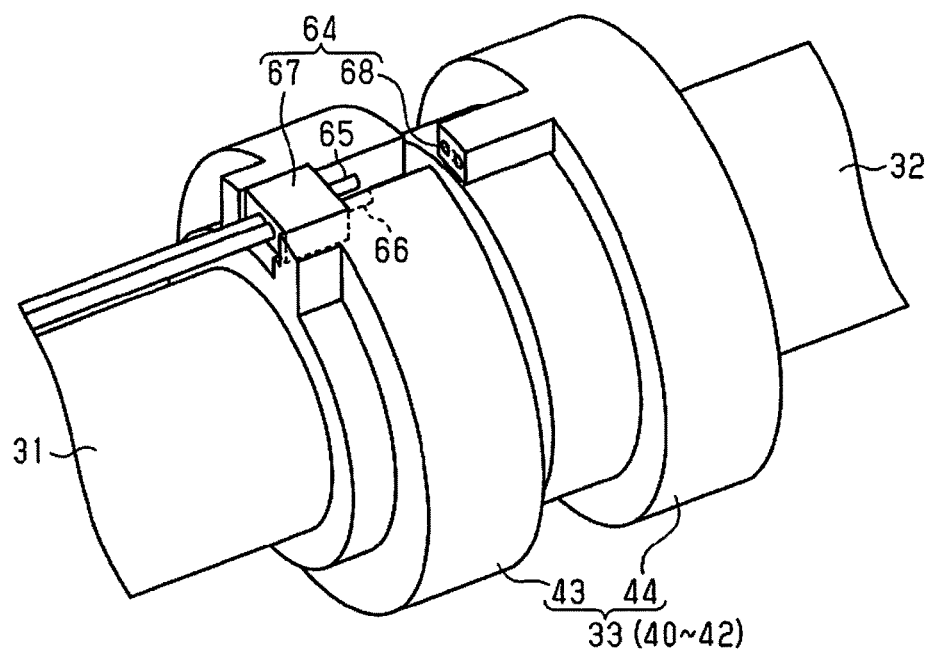
FIG. 9 is a perspective diagram illustrating an enlargement of a first connection section and a second connection section of a connection member.

As shown in FIG. 9, detecting units 64 for detecting when the connection between the first connection section 43 and the second connection section 44 is released are provided in each of the connection members 33 and 40 to 42. The detecting unit 64 is provided with a terminal section 67 which is provided with a pair of terminals 65 and 66 and a conductor 68 for short circuiting the pair of terminals 65 and 66. The terminal section 67 is attached to one (the first connection section 43 in this example) out of the first connection section 43 and the second connection section 44 and the conductor 68 is attached to the other one (the second connection section 44 in this example) out of the first connection section 43 and the second connection section 44.

Then, when the first connection section 43 and the second connection section 44 are connected, the pair of terminals 65 and 66 in the terminal section 67 are short circuited by the conductor 68. In addition, when the first connection section 43 and the second connection section 44 are connected, short circuiting of the pair of terminals 65 and 66 in the terminal section 67 by the conductor 68 is terminated. When short circuiting of the pair of terminals 65 and 66 by the conductor 68 is terminated, the detecting unit 64 outputs a signal which corresponds to the short circuiting being terminated.

Figure 10:
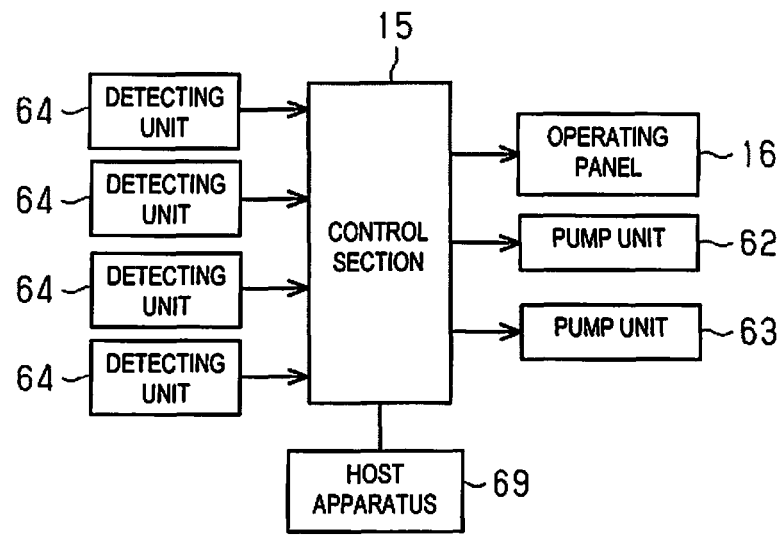
FIG. 10 is a block diagram illustrating an electric configuration of a recording apparatus.

FIG. 10 is a block diagram illustrating an electric configuration of the recording apparatus 11. The detecting units 64 which correspond to the connection members 33 and 40 to 42 are connected to input circuits in the control section 15 of the recording apparatus 11. In addition, the operating panel 16, the pump unit 62, and the pump unit 63 are connected to input circuits in the control section 15. In addition, a host apparatus 69 such as a personal computer which is connected to the recording apparatus 11 is also connected to the control section 15.

When short circuiting of the pair of terminals 65 and 66 in the terminal section 67 by the conductor 68 is terminated based on releasing of the connection between the first connection section 43 and the second connection section 44, the control section 15 in the recording apparatus 11 detects that the connection between the first connection section 43 and the second connection section 44 is released due to inputting of the signal from the detecting unit 64 which corresponds to the short circuiting being terminated.

The control section 15 executes a blocking process for blocking the flow of ink from the ink tanks 20 and 22 to 25 side to the liquid ejecting head 14 side when releasing of the connection between the first connection section 43 and the second connection section 44 is detected using the detecting unit 64 as described above. That is, the control section 15 operates the pump unit 62 and the pump unit 63 so that the flow of ink from the ink tanks 20 and 22 to 25 side to the liquid ejecting head 14 side is blocked.

In addition, the control section 15 carries out notification that releasing of the connection between the first connection section 43 and the second connection section 44 is detected using the detecting unit 64 as described above by displaying this on a display section in the operating panel 16. At this time, the operating panel 16 functions as an information transmitting section for carrying out notification that releasing of the connection between the first connection section 43 and the second connection section 44 is detected.

According to the present embodiment, the following effects are able to be obtained in addition to the effects of (1) to (4) in the first embodiment.

(4) There is a possibility that connection between the first connection section 43 and the second connection section 44 could be erroneously released with the recording apparatus 11 being in a state where the power source is turned on. At this time, the control section 15 detects that the connection between the first connection section 43 and the second connection section 44 is released using the detecting unit 64 and executes the blocking process based on this. In the blocking process, the pump unit 62 and the pump unit 63 are operated so that the flow of ink from the ink tanks 20 and 22 to 25 side to the liquid ejecting head 14 side is blocked. Accordingly, it is possible to avoid liquid flowing from the ink tanks 20 and 22 to 25 side to the liquid ejecting head 14 side in a state where the connection between the first connection section 43 and the second connection section 44 is erroneously released.

(5) In addition, the control section 15 displays that releasing of the connection between the first connection section 43 and the second connection section 44 is detected using the detecting unit 64 on the display section of the operating panel 16. It is possible to prompt an operator to take action by informing the operator that the connection is erroneously released through notification that the connection between the first connection section 43 and the second connection section 44 is erroneously released in this manner.

[Other Embodiments]

Here, it is possible to modify each of the embodiments described above in, for example, the following manner.

Figure 11:
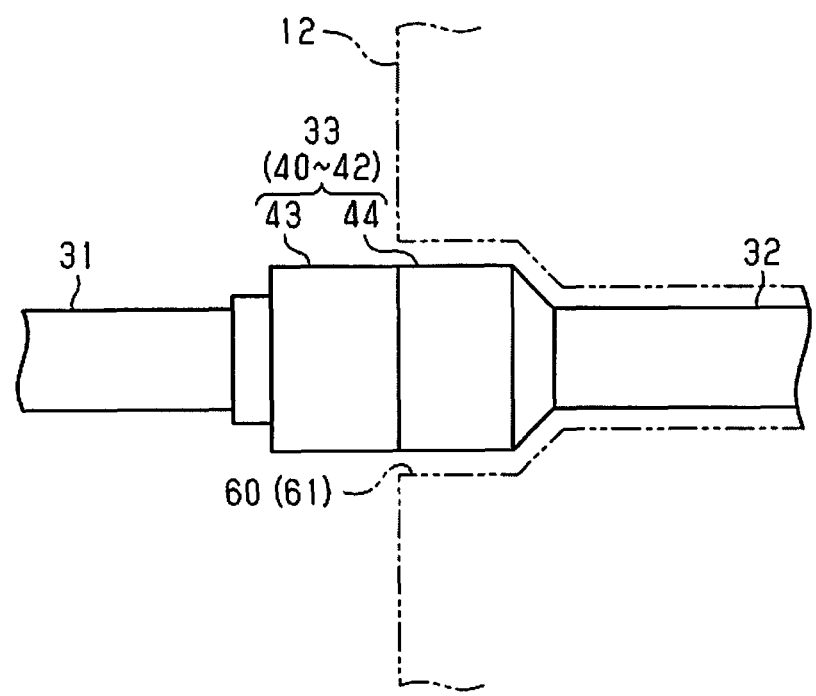
FIG. 11 is a schematic diagram illustrating another example of an arrangement of a first connection section and a second connection section of a connection member with regard to a main housing.

The connection members 33 and 40 to 42 may be provided so that only the first connection sections 43, out of the first connection sections 43 and the second connection sections 44 of the connection members 33 and 40 to 42, are positioned at outer sections of the main housing 12 as shown in FIG. 11.

Figure 12:
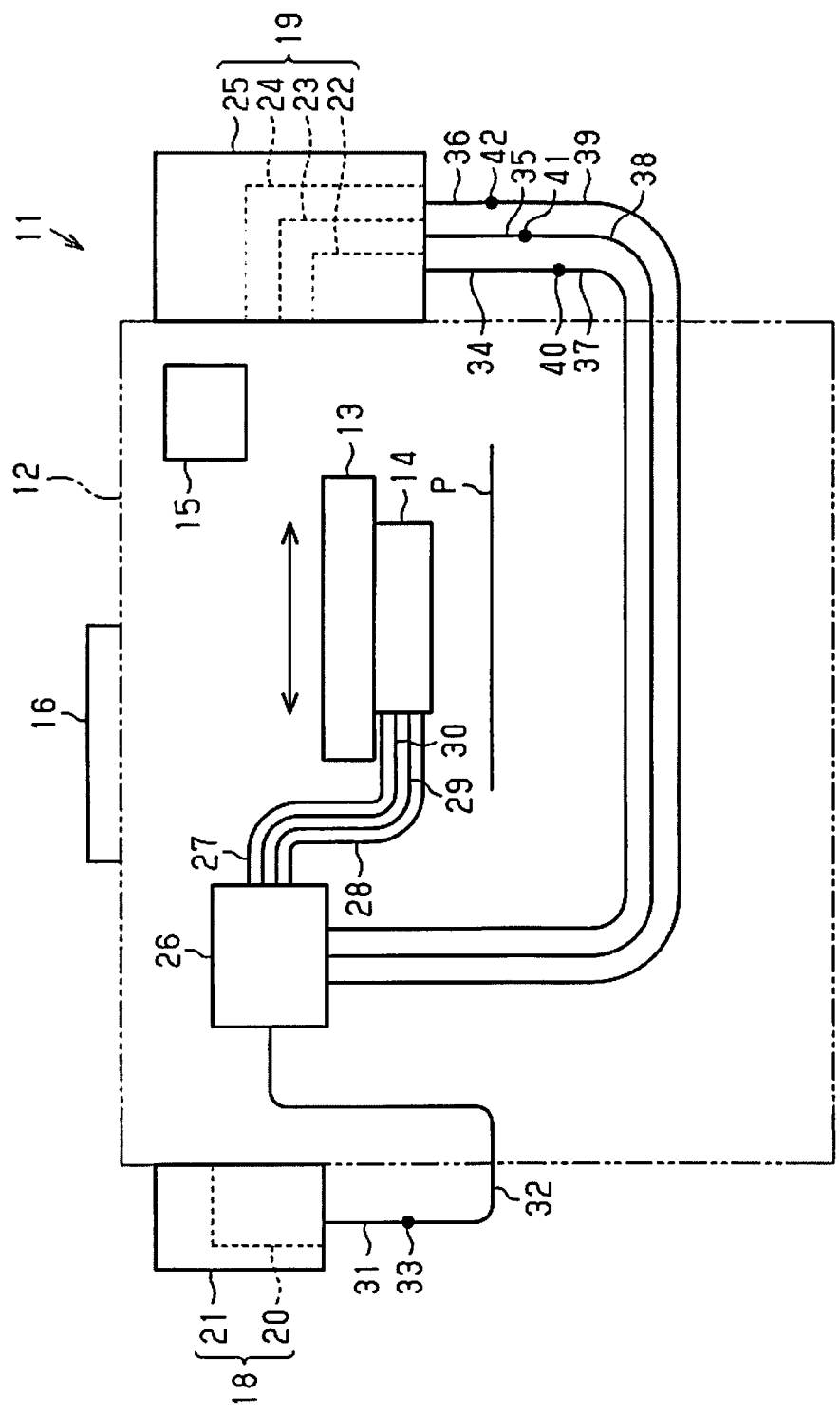
FIG. 12 is a schematic diagram illustrating inner sections and peripheral structures of a main housing of a recording apparatus.

FIG. 12 illustrates another example of the arrangement of the connection members 33 and 40 to 42. In the connection members 33 and 40 to 42 which are shown in FIG. 12, at least the first connection sections 43 may be provided so as to be positioned at outer sections of the container casings 21 and 25 and so as to be positioned at outer sections of the main housing 12.

Figure 13:
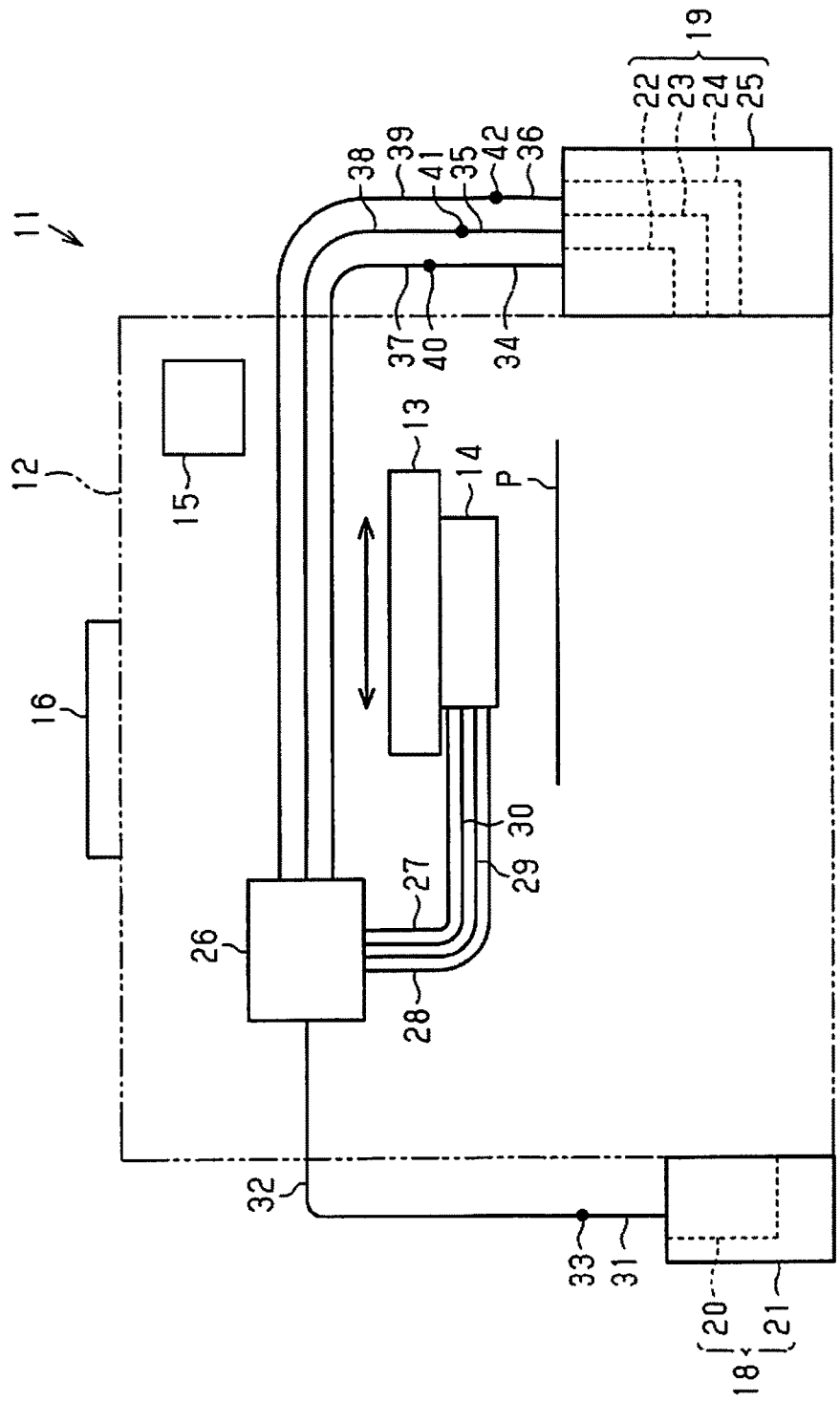
FIG. 13 is a schematic diagram illustrating inner sections and peripheral structures of a main housing of a recording apparatus.

There may be a configuration as shown in FIG. 13 where the first liquid supply tubes 31 and 34 to 36 and the second liquid supply tubes 32 and 37 to 39 are wound around upper sections of the container casings 21 and 25 and the connection members 33 and 40 to 42 are positioned at upper sections of the container casings 21 and 25.

Figure 14:
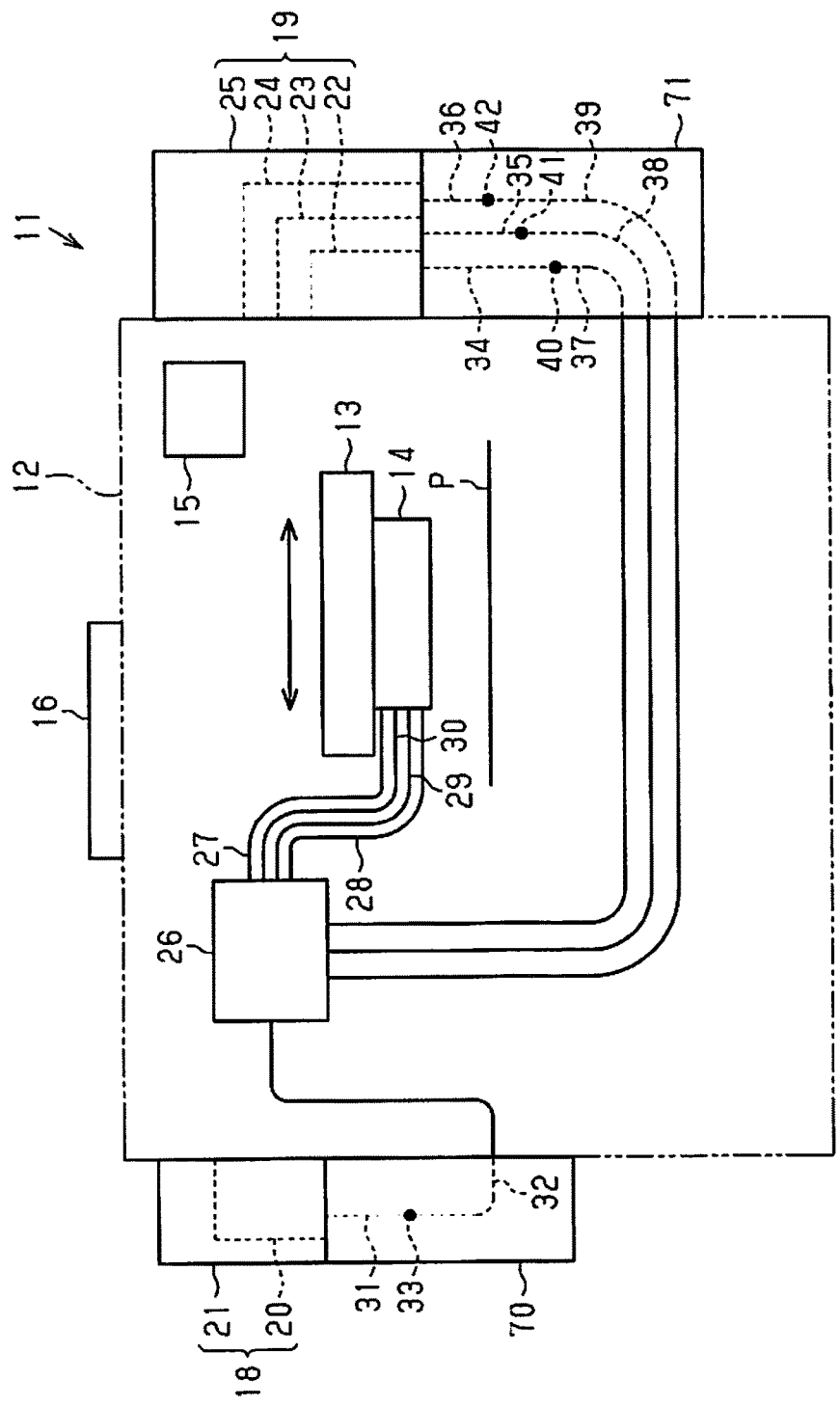
FIG. 14 is a schematic diagram illustrating inner sections and peripheral structures of a main housing of a recording apparatus.

As shown in FIG. 14, the connection members 33 and 40 to 42 (to be precise, at least the connection sections 43 of the connection members 33 and 40 to 42) may be provided so as to be positioned at outer sections of the main housing 12 and at outer sections of the container casing 21 and 25 and cover members 70 and 71 which cover the connection members 33 and 40 to 42 may be provided.

The container casings 21 and 25 may be omitted and the ink tanks 20 and 22 to 24 may be provided so as to be able to directly attached and detached with regard to the main housing 12.

Instead of the valve mechanisms which seals the openings in the first connection sections 43 and the openings in the second connection sections 44, these openings may be sealed using sealing members such as caps. In this case, it is considered that the sealing members are provided at the first liquid supply tubes 31 and 34 to 36 and the second liquid supply tubes 32 and 37 to 39 around the connection members 33 and 40 to 42 and it is possible for an operator to manually attach and remove the sealing members with regard to the openings in the first connection sections 43 and the openings in the second connection sections 44.

The recording apparatus 11 is not limited to performing recording (printing) on the printing paper P and may perform recording on a medium such as cloth, plastic film, and CDs.

The positional relationship between the terminal section 67 and the conductor 68 may be reversed in the detecting unit 64 in the second embodiment.

An ink end sensor which, when the connection between the first connection section 43 and the second connection section 44 is released, detects movement of ink at the first liquid supply tube 31 and 34 to 36 sides which accompanies the connection being released may be provided in the second embodiment, and the connection being released may be detected using the ink end sensor. In this case, the ink end sensor takes on the role of the detecting section.

In the second embodiment, the display section of the operating panel 16 is given as an example of the information transmitting section for carrying out notification that releasing of the connection between the first connection section 43 and the second connection section 44 is detected, but a different information transmitting section may be adopted. For example, notification may be carried out using a warning sound from a speaker or an error message on a display of the host apparatus 69 (such as a personal computer). In this case, the speaker, the display, or the like functions as the information transmitting section for carrying out notification that releasing of the connection between the first connection section 43 and the second connection section 44 is detected.

Either out of executing the blocking process and notification by the information transmitting section when releasing of the connection between the first connection section and the second connection section is detected using the detecting unit in the second embodiment may be omitted.

In each of the embodiments described above, the recording apparatus 11 may be a recording apparatus which performs recording by ejecting or discharging liquids other than ink. For example, the recording apparatus 11 may be a recording apparatus which performs recording by ejecting a liquid body which includes materials such as electrode materials or colorants (pixel materials) being dispersed or dissolved so as to be used in manufacturing liquid crystal displays, EL (electroluminescent) displays, field emission displays, and the like. In addition, the recording apparatus 11 may be a recording apparatus which ejects fluid bodies such as gels (for example, physical gels).

DESCRIPTION OF REFERENCE NUMERALS

11 RECORDING APPARATUS
12 MAIN HOUSING
13 CARRIAGE
14 LIQUID EJECTING HEAD
15 CONTROL SECTION
16 OPERATING PANEL
18, 19 LIQUID CONTAINER UNIT
20 INK TANK
21 CONTAINER CASING
22-24 INK TANK
25 CONTAINER CASING
26 RELAY UNIT
27-30 RELAY TUBE
31 FIRST LIQUID SUPPLY TUBE
32 SECOND LIQUID SUPPLY TUBE
33 CONNECTION MEMBER
34-36 FIRST LIQUID SUPPLY TUBE
37-39 SECOND LIQUID SUPPLY TUBE
40-42 CONNECTION MEMBER
43 FIRST CONNECTION SECTION
44 SECOND CONNECTION SECTION
45 VALVE BODY
46 SPRING
47 PACKING
48 HOLE
49 CYLINDRICAL SECTION
50 COMMUNICATION PATH
51 CHECK VALVE
52 VALVE BODY
53 SPRING
54 LOCKING SECTION
55, 56 COVER
57-59 LOCKING SECTION
60, 61 OPENING
62, 63 PUMP UNIT
64 DETECTING UNIT
65, 66 TERMINAL
67 TERMINAL SECTION
68 CONDUCTOR
69 HOST APPARATUS
70, 71 COVER MEMBER

The invention claimed is:

1. A recording apparatus comprising:
a main housing;
a liquid ejecting head which is provided in an inner section of the main housing and which ejects a liquid with regard to a target;
a liquid container section which is provided on an outer section of the main housing;
a container casing where the liquid container section is contained, the container casing being provided on the outer section of the main housing;
a first liquid supply tube where one end section side is connected to the liquid container section, the first liquid supply tube extending from the liquid container section and extending inside of the container casing;
a second liquid supply tube where one end section side is connected to the liquid ejecting head side, the second liquid supply tube extending from an inside of the main housing to an inside of the container casing; and
a connection member which connects the other end section sides of the first liquid supply tube and the second liquid supply tube,
wherein the connection member is configured by a first connection section which is provided on the first liquid supply tube side and a second connection section which is provided on the second liquid supply tube side, and
at least the first connection section of the connection member is entirely positioned outside of the liquid container section and positioned at an inner section of the container casing which is provided at the outer section of the main housing.

2. The recording apparatus according to claim 1, wherein an opening is formed in the main housing so that at least the first connection section of the connection member is exposed inside the container casing, and the position of the opening is set so that the opening is at a position so as to expose toward the outside of the container casing when a cover for the container casing is removed.

3. The recording apparatus according to claim 2, wherein the liquid container section is configured to be freely attached and detached via a locking section, and the opening is provided at a location which is different to the locking section.

4. The recording apparatus according to claim 1, wherein sealing members, which seal the first liquid supply tube and the second liquid supply tube when the connection between the other end section sides of the first liquid supply tube and the second liquid supply tube using the first connection section and the second connection section is released, are provided at an end section of the first liquid supply tube on the first connection section side and at an end section of the second liquid supply tube on the second connection section side.

5. The recording apparatus according to claim 1, further comprising:
a valve mechanism which has a valve body which is able to be displaced between a sealing position for sealing an opening in one of end sections out of an end section of the first liquid supply tube on the first connection section side and an end section of the second liquid supply tube on the second connection section side and an open position for opening the opening in the one end section, and a pressing section which presses the valve body toward the sealing position,
wherein the valve mechanism is configured so that the valve body is held at the open position against pressing force of the pressing section when the first connection section and the second connection section are in a state of being connected and holding of the valve body at the open position is released when the first connection section and the second connection section are separated, and the valve mechanism has a check valve which is provided at the end section which is the opposite of the end section where the opening is sealed using the valve body, and
the check valve is configured so as to permit only flow of liquid from the liquid container section side to the liquid ejecting head side.

6. The recording apparatus according to claim 1,
wherein a detecting unit, which detects that the connection between the first connection section and the second connection section is released, is provided in the connection member, and
a control section is provided so as to execute a blocking process for blocking flow of liquid from the liquid container section side to the liquid ejecting head side when releasing of the connection between the first connection section and the second connection section is detected using the detecting unit.

7. The recording apparatus according to claim 1,
wherein a detecting unit, which is for detecting that the connection between the first connection section and the second connection section is released, is provided in the second connection section, and
an information transmitting section is provided to carry out notification that releasing of the connection between the first connection section and the second connection section is detected using the detecting unit when the releasing of the connection is detected.

8. The recording apparatus according to claim 1,
wherein the first liquid supply tube extends outside from the liquid container section such that the other end section side of the first liquid supply tube is positioned outside of the liquid container section, and
the first connection section is disposed at the other end section side of the first liquid supply tube.

9. The recording apparatus according to claim 1, further comprising
a liquid container unit including the container casing and a cover detachably attached to the container casing, and
a locking section which is disposed in the container casing and to which the liquid container section is removably locked, wherein
the cover is configured to be attached to and detached from the container casing in a state where the liquid container section is locked to the locking section.

10. A recording apparatus comprising:
a main housing;
a liquid ejecting head which is provided in an inner section of the main housing and which ejects a liquid with regard to a target;
a liquid container section which is provided on an outer section of the main housing;
a container casing where the liquid container section is contained;
a first liquid supply tube where one end section side is connected to the liquid container section;
a second liquid supply tube where one end section side is connected to the liquid ejecting head side; and
a connection member which connects the other end section sides of the first liquid supply tube and the second liquid supply tube,
wherein the connection member is configured by a first connection section which is provided on the first liquid supply tube side and a second connection section which is provided on the second liquid supply tube side,
at least the first connection section of the connection member is entirely positioned outside of the liquid container section and positioned at an inner section of the container casing which is provided at the outer section of the main housing, and
an opening is formed in the main housing so that at least the first connection section of the connection member is exposed inside the container casing, and the position of the opening is set so that the opening is at a position so as to expose toward the outside of the container casing when a cover for the container casing is removed.

11. A recording apparatus comprising:
a main housing;
a liquid ejecting head which is provided in an inner section of the main housing and which ejects a liquid with regard to a target;
a liquid container section which is provided on an outer section of the main housing;
a container casing where the liquid container section is contained;
a first liquid supply tube where one end section side is connected to the liquid container section;
a second liquid supply tube where one end section side is connected to the liquid ejecting head side;
a connection member which connects the other end section sides of the first liquid supply tube and the second liquid supply tube, the connection member being configured by a first connection section which is provided on the first liquid supply tube side and a second connection section which is provided on the second liquid supply tube side, and at least the first connection section of the connection member being entirely positioned outside of the liquid container section and positioned at an inner section of the container casing which is provided at the outer section of the main housing;
a detecting unit which detects that the connection between the first connection section and the second connection section is released and is provided in the connection member; and
a control section provided so as to execute a blocking process for blocking flow of liquid from the liquid container section side to the liquid ejecting head side when releasing of the connection between the first connection section and the second connection section is detected using the detecting unit.

* * * * *